US010802928B2

(12) United States Patent
Matsui et al.

(10) Patent No.: US 10,802,928 B2
(45) Date of Patent: Oct. 13, 2020

(54) BACKUP AND RESTORATION OF FILE SYSTEM

(71) Applicant: International Business Machines Corporation, Armonk, NY (US)

(72) Inventors: Sosuke Matsui, Yokohama (JP); Tsuyoshi Miyamura, Yokohama (JP); Yutaka Oishi, Kawasaki (JP); Takahiro Tsuda, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 14/849,652

(22) Filed: Sep. 10, 2015

(65) Prior Publication Data
US 2017/0075771 A1 Mar. 16, 2017

(51) Int. Cl.
G06F 11/14 (2006.01)

(52) U.S. Cl.
CPC ...... *G06F 11/1469* (2013.01); *G06F 11/1451* (2013.01)

(58) Field of Classification Search
CPC .................................................. G06F 11/1469
See application file for complete search history.

(56) References Cited

U.S. PATENT DOCUMENTS

| | | | |
|---|---|---|---|
| 6,282,607 B1 * | 8/2001 | Hillyer | G06F 3/0611 711/111 |
| 7,225,204 B2 | 5/2007 | Manley et al. | |
| 8,126,847 B1 * | 2/2012 | Zheng | G06F 11/1469 707/640 |
| 8,504,529 B1 * | 8/2013 | Zheng | G06F 16/13 707/679 |
| 8,606,751 B1 | 12/2013 | Starling et al. | |
| 8,886,901 B1 * | 11/2014 | Hsu | G06F 3/0647 711/161 |
| 8,977,598 B2 | 3/2015 | Montulli et al. | |
| 8,990,162 B1 | 3/2015 | Kushwah et al. | |
| 10,127,119 B1 * | 11/2018 | Paulzagade | G06F 11/1469 |

(Continued)

FOREIGN PATENT DOCUMENTS

| | | |
|---|---|---|
| JP | 2002108673 A | 4/2002 |
| JP | 2004038929 A | 2/2004 |

(Continued)

OTHER PUBLICATIONS

Chen et al., "CoStore: A Reliable and Highly Available Storage System Using Clusters", 2002, IEEE, Proceedings of the 16th Annual International Symposium on High Performance Computing Systems and Applications (HPCS'02), pp. 1-9.

*Primary Examiner* — Dawaune A Conyers
(74) *Attorney, Agent, or Firm* — Michael A. Petrocelli

(57) ABSTRACT

A method for restoring a target file system in a storage system by a computer system, the computer system being connected to a network, the storage system including a tier of sequential access media, the method includes receiving a backup image including metadata of a file of the target file system, from a remote computer system via the network, the metadata indicating a sequential access medium, and restoring the metadata of the target file system using the backup image, the target file system being restored on the computer system by sharing a resource with a native file system operating on the computer system.

12 Claims, 8 Drawing Sheets

(56) References Cited

U.S. PATENT DOCUMENTS

| | | | |
|---|---|---|---|
| 2004/0044853 A1* | 3/2004 | Gibble | G06F 3/0605 |
| | | | 711/154 |
| 2007/0185934 A1* | 8/2007 | Cannon | G06F 11/1469 |
| | | | 707/204 |
| 2009/0177836 A1* | 7/2009 | Mimatsu | G06F 16/122 |
| | | | 711/111 |
| 2010/0246578 A1 | 9/2010 | Zhong et al. | |
| 2012/0136832 A1 | 5/2012 | Sadhwani | |
| 2013/0268493 A1* | 10/2013 | Berman | G06F 11/1451 |
| | | | 707/649 |
| 2014/0074787 A1* | 3/2014 | Berman | G06F 11/1451 |
| | | | 707/639 |
| 2014/0181040 A1 | 6/2014 | Montulli et al. | |
| 2014/0372384 A1 | 12/2014 | Long et al. | |
| 2015/0261465 A1* | 9/2015 | Joseph | G06F 3/0619 |
| | | | 711/104 |
| 2016/0110262 A1* | 4/2016 | Nanivadekar | G06F 11/1469 |
| | | | 707/654 |

FOREIGN PATENT DOCUMENTS

| | | |
|---|---|---|
| JP | 2006092553 A | 4/2006 |
| JP | 2012198918 A | 10/2012 |
| JP | 2014089573 A | 5/2014 |
| JP | 5574774 B2 | 8/2014 |
| WO | 9946660 A2 | 9/1999 |
| WO | 0190843 A2 | 11/2001 |
| WO | 2007002397 A2 | 1/2007 |
| WO | 2007118243 A2 | 10/2007 |
| WO | 2008055214 A2 | 5/2008 |
| WO | 2011053450 A2 | 5/2011 |
| WO | 2012024800 A1 | 3/2012 |
| WO | 2012166443 A1 | 12/2012 |

\* cited by examiner

BACKUP AND RESTORATION OF FILE SYSTEM

BACKGROUND

The present invention, generally, relates to maintenance of file systems, more particularly, to backup and restoration of file systems.

Data backup is important to protect information asset against potential data loss events due to disasters or other unexpected accidents. In case of a disaster, a system may be restored by using backed up data that has been acquired in advance.

Tape medium, which is one of a sequential access media, is known as an inexpensive and large volume storage medium. The data may be backed up to the tape media during off-peak hours, for example. Then, the backed up tape media may be transported to another restore site that is prepared for disasters. When a disaster occurs, all data are read from the backed up tape media to restore the system on the restore site.

SUMMARY

According to an embodiment of the present invention, a method for restoring a target file system in a storage system by a computer system is provided. The computer system is connected to a network and the storage system includes a tier of sequential access media. The method may include receiving a backup image including metadata of a file of the target file system, from a remote computer system via the network, in which the metadata indicates a sequential access medium. The method may also include restoring the metadata of the target file system using the backup image, in which the target file system is restored on the computer system by sharing a resource with a native file system that operates on the computer system.

According to other embodiment of the present invention, a method for backing up a target file system in a storage system by a computer system may be provided. The computer system may be connected to a network and the storage system includes a tier of sequential access media. The method may include acquiring a backup image including metadata of a file of the target file system, in which the metadata indicates a sequential access medium. The method may also include transferring the backup image to a remote computer system via the network, in which the backup image is used to restore the metadata of the target file system by sharing a resource with a remote site file system operating on the remote computer system.

According to another embodiment of the present invention, a computer system for managing a file system may be provided. The computer system may be connected to a network. The storage system may include a tier of sequential access media. The computer system may include a transfer module configured to receive a backup image including metadata of a file of a remote site file system, from a remote computer system via the network, in which the metadata indicates a sequential access medium. The storage system may also include a file system module configured to restore the metadata of the remote site file system using the backup image, in which the remote site file system is restored on the computer system by sharing a resource with a native file system that operates on the computer system.

Computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
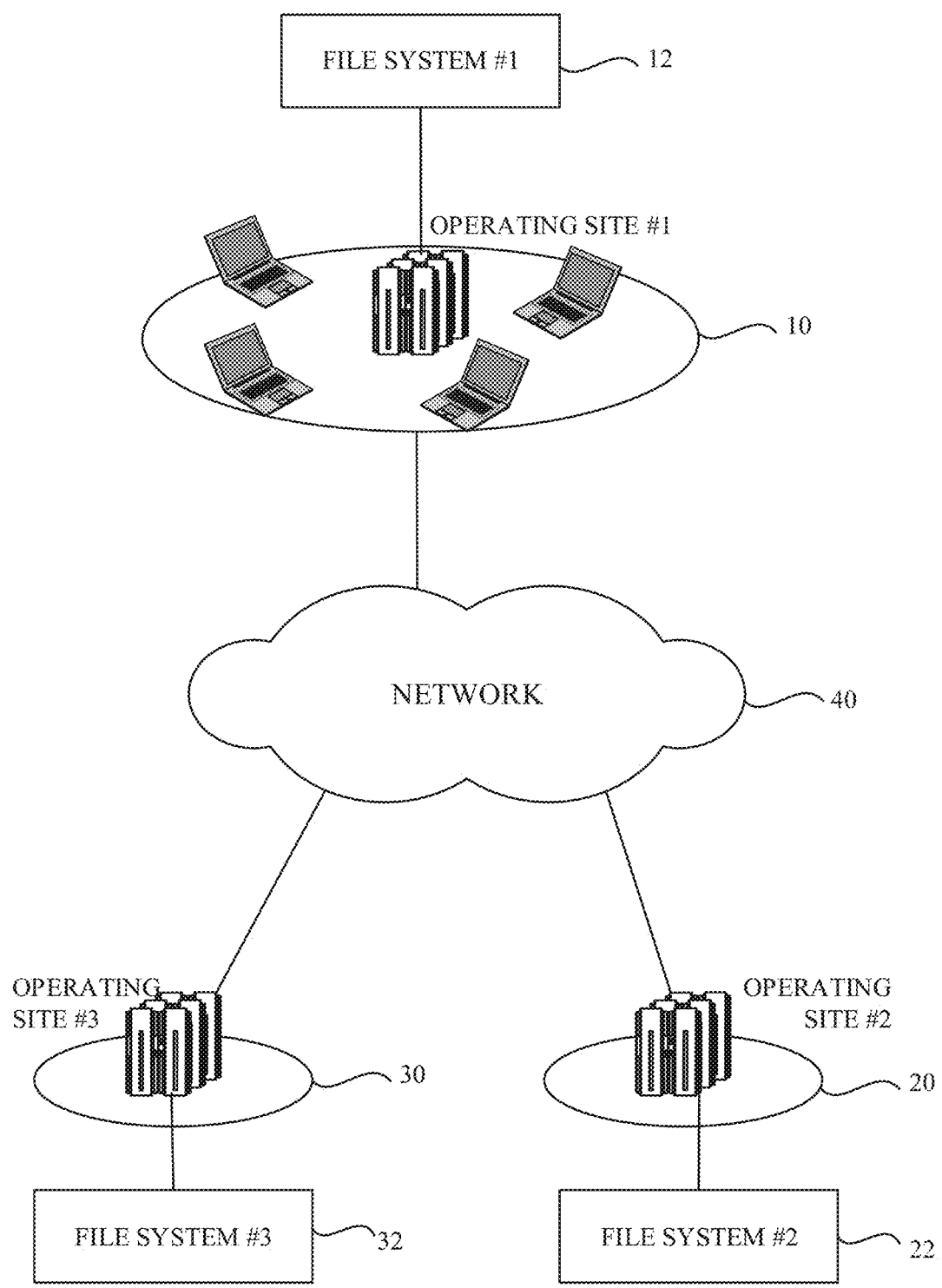
FIG. 1 shows an overview of environment including a plurality of hierarchical storage systems, according to an exemplary embodiment of the present invention.

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

In the following description, numerous specific details are set forth, such as particular structures, components, materials, dimensions, processing steps, and techniques, in order to provide a thorough understanding of the present invention. However, it will be appreciated by one of ordinary skill of the art that the invention may be practiced without these specific details. In other instances, well-known structures or processing steps have not been described in detail in order to avoid obscuring the invention. In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

As described above, a tape medium may be generally known as an inexpensive and large volume storage medium. The data may be backed up to the tape media during off-peak hours, for example. Then, the backed up tape media may be transported to another restore site that is prepared for disasters. When a disaster occurs, all data are read from the backed up tape media to restore the system on the restore site. However, a considerably long time may be required to complete the restoration of the system if only reading of the backed up data is performed, this may occur mainly due to the sequential nature of the backed up data.

Also, a considerably large investment may be required to set up resources for a restore site, the associated costs may be comparable to those of an original operating site. Additionally, due the low probability of losing such a large amount of data, the cost of setting a restore site just in case of a disaster may occur may not be justified. Particularly, since the amount of data to be protected increases daily which may cause considerable delays in time to resume business.

Therefore, embodiments of the present invention may provide a method, system, and computer program product for backing up and/or restoring files in a storage system capable of reducing restoration time and associated costs.

Referring to FIGS. 1-8, a hierarchical storage system including a disk tier and a tape tier above the disk tier and a method for backing up and restoring a target file system in the hierarchical storage system are described, according to one embodiment of the present disclosure.

Referring now to FIG. 1, an exemplary computer environment including a plurality of hierarchical storage systems is shown, according to an embodiment of the present disclosure. A plurality of operating sites 10, 20, 30 may be provided in the environment shown in FIG. 1, each of which may be connected to a network 40. The network 40 may include, but is not limited to, LAN (Local Area Network), MAN (Metropolitan Area Network), WAN (Wide Area Network), Internet, etc. The operating sites 10, 20, 30 may be geographically separated from each other.

A file system 12, 22 or 32 may be operated at the corresponding operating site 10, 20, or 30, as illustrated in FIG. 1. Each file system 12, 22, or 32 may provide a functionality to manage files in a hierarchical storage system on each operating site 10, 20 and 30, independently. The operating sites 10, 20, and 30 may communicate with each other via the network 40.

Note that the figure describes that each operating site 10, 20, or 30 provides merely one file system 12, 22, or 32. However, the environment shown in FIG. 1 is only an example and is not intended to suggest any limitation. In another embodiment, more than one file systems may be operated at an operating site.

Figure 2:
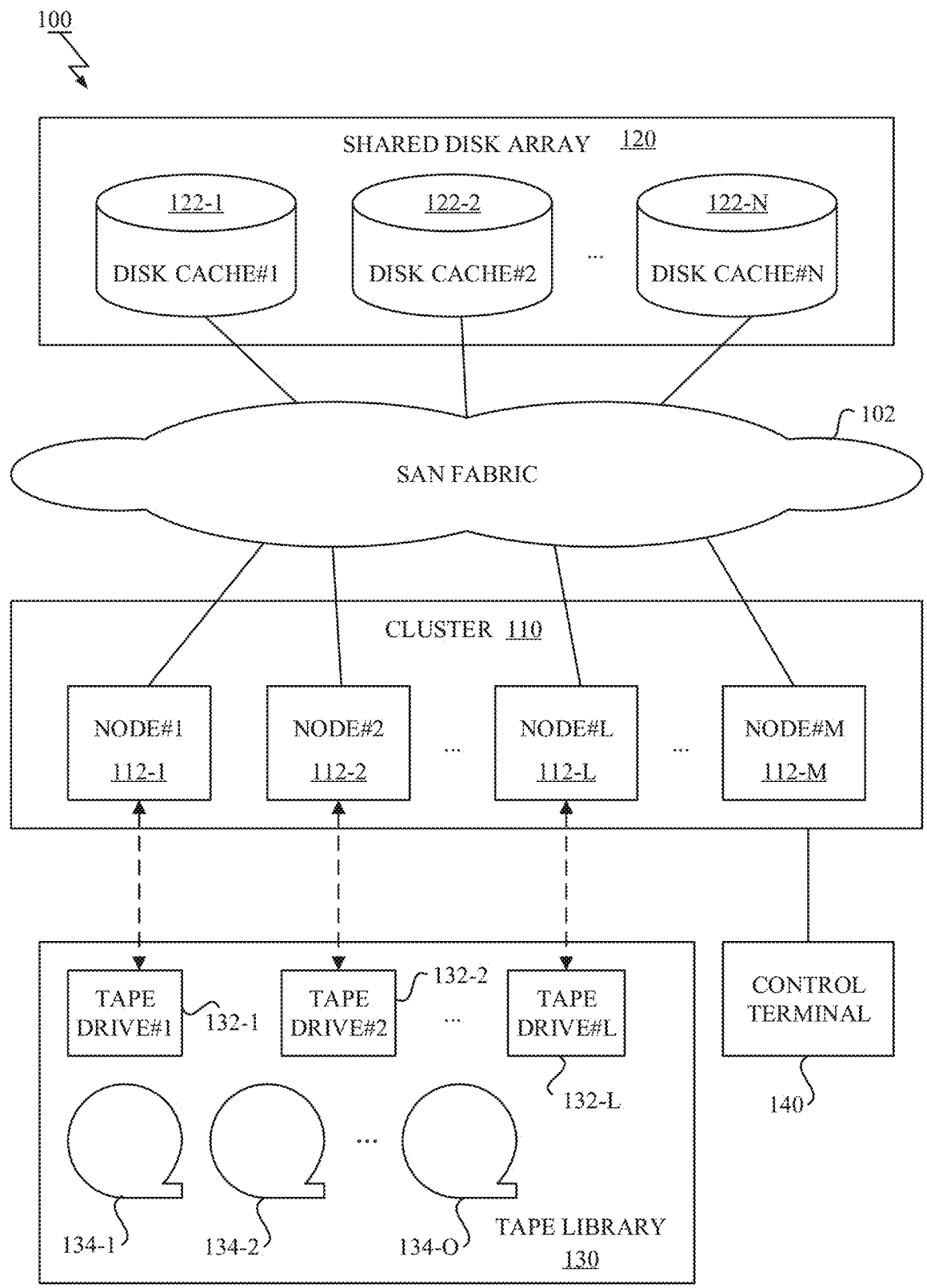
FIG. 2 shows an overview of a hierarchical storage system, according to the exemplary embodiment of the present invention.

Referring now to FIG. 2, an overview of a hierarchical storage system 100 is shown, according to an embodiment of the present disclosure. Note that the hierarchical storage system 100 shown in FIG. 2 may correspond to each hierarchical storage system within the operating sites 10, 20, and 30 shown in FIG. 1.

The hierarchical storage system 100 may provide a file system that includes a cluster 110 with one or more nodes 112-1 to 112-M to manage files.

As shown in FIG. 2, the hierarchical storage system 100 may include a shared disk array 120 that includes one or more disk caches 122-1 to 122-N. Each node 112 in the cluster 110 may be connected to the disk cache 122 in the shared disk array 120 via a SAN (Storage Area Network) fabric 102. The SAN fabric 102 may include, but is not limited to, FC (Fibre Channel)-SAN based on a fiber channel network and/or IP (Internet Protocol)-SAN based on TCP (Transmission Control Protocol)/IP network with LAN (Local Area Network) switches.

The nodes 112 may share the disk caches 122. The node 112 may access the disk cache 122 via the SAN fabric 102 and provide also indirect file access to other nodes that do not connect to the SAN fabric 102. It should be noted that a file system distributed to the one or more nodes 112 in the cluster 110, and in which a plurality of nodes (including client nodes) interact, may be typically known in the art as a clustered file system or distributed parallel file system. The clustered file system may provide a global namespace, a striping functionality to stripe input and output over the nodes and an information lifecycle management (ILM) functionality.

Such clustered file system may include, but is not limited to, GPFS™ (General Parallel File System), GFS (Global File System), OCFS (Oracle™ Cluster File System), Luster, GlusterFS, etc.

The hierarchical storage system 100 may further include a tape library 130. The tape library 130 may include one or more tape drives 132 and one or more tape media 134. Any tape medium 134 may correspond to a sequential access medium used for backup. Each node 112 in the cluster 110 may be connected to the tape library 130 via SAN fabric 102, FC LVD (Low Voltage Differential) SCSI (Small Computer System Interface) or SAS (Serial Attached SCSI) cables. The tape library 130 may include a plurality of tape drives 132 to enable the plurality of nodes 112 to access a set of the tape media 134 simultaneously. The tape drive 132 may be occupied by the node at a point in time and may be used alternately. The tape drives 132 accept preferably LTO (Linear Tape-Open) Ultrium 5 or later tape medium, which support LTFS.

The tape library 130 may be managed by a software such as LTFS (Liner Tape File System) and integrated to the clustered file system so that at least part of data in the shared disk array 120 is stored on tape media 134 in the tape library 130. Files may migrate or pre-migrate from the shared disk array 120 to the tape library 130 based on a predetermined migration or pre-migration policy.

The hierarchical storage system 100 may further include a control terminal 140. The control terminal 140 is a terminal device where an administrative user may operate to issue a manual request and to specify settings of the hierarchical storage system 100. By using the control terminal 140, the administrative user may specify settings of the backup and restoration processes, as will be described below. The administrative user may also issue the manual request and specify schedules or policies for other functionalities of the hierarchical storage system 100 such as migration, recall, reclamation, reconciliation, file placement, file management, etc.

As shown in FIG. 2, the nodes 112-1 to 112-M are described to be connected to the disk caches 122-1 to 122-N in the shared disk array 120 and the nodes 112-1 to 112-L are described to be connected to the tape drives 132-1 to 132-L in the tape library 130. However, the configuration of the hierarchical storage system 100 shown in FIG. 2 is only an example for typical storage system and is not intended to suggest any limitation.

For instance, in one embodiment, the shared disk array 120 may be divided in one or more online storages and one or more near-line storages to construct three or more tiered architecture. In another embodiment, the hierarchical storage system 100 may further include a flash storage tier on top of the hierarchical storage system 100. In another embodiment, the storage system may have merely one node, one disk cache and one tape drive to construct a hierarchical storage system. In yet another embodiment, another type of a sequential access medium may be used in place of or in addition to the tape medium.

Figure 3:
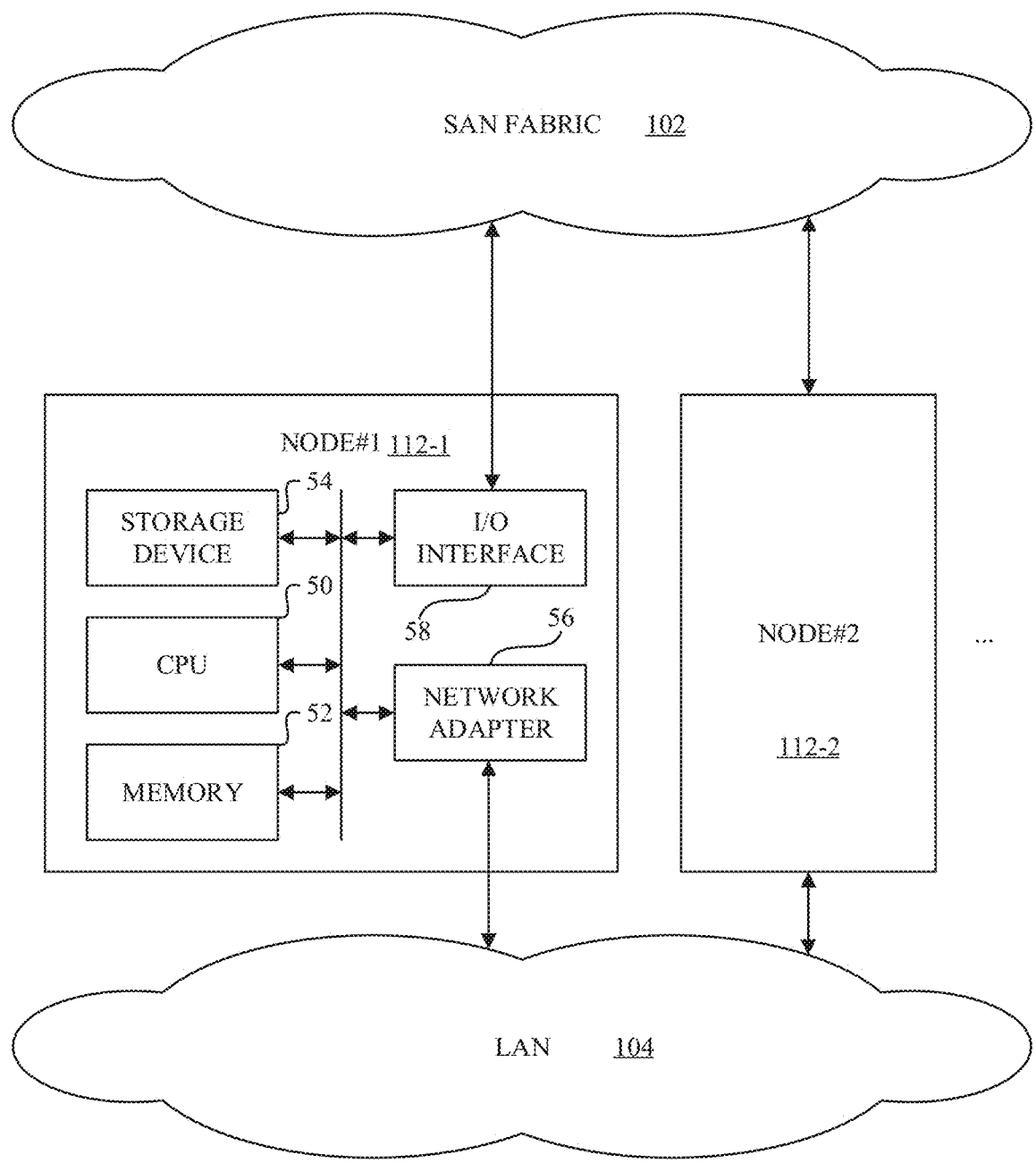
FIG. 3 depicts a node constituting a cluster of the hierarchical storage system, according to the exemplary embodiment of the present invention.

Referring now to FIG. 3, a schematic of an example of a node is shown, according to an embodiment of the present disclosure. The node 112 is only one example of a suitable node and is not intended to suggest any limitation as to the scope of use or functionality of embodiments of the invention described herein. Regardless, the node 112 is capable of being implemented and/or performing any of the functionality set forth hereinabove.

The node 112 is operational with numerous other general purpose or special purpose computing system environments or configurations. Examples of well-known computing systems, environments, and/or configurations that may be suitable for use with the node 112 may include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The node 112 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 3, the node 112 may include a general-purpose computing device. The components of the node 112 may include, but are not limited to, one or more processors (or processing units) 50 and a memory 52 operatively coupled to the processors 50 by a bus including a memory bus or memory controller, and a processor or local bus using any of a variety of bus architectures.

The node 112 may typically include a variety of computer system readable media. Such media may be any available media that is accessible by the node 112, and it includes both volatile and non-volatile media, removable and non-removable media.

The memory 52 may include computer system readable media in the form of volatile memory, such as random access memory (RAM). The node 112 may further include other removable/non-removable, volatile/non-volatile computer system storage media. By way of example only, the storage device 54 may be provided for reading from and writing to a non-removable, non-volatile magnetic media. Although not shown in the figures, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus by one or more data media interfaces. As will be described below, the storage device 54 may include at least one program product having a set (e.g., at least one) of program modules that are configured to carry out the functions of embodiments of the invention.

Program/utility, having a set (at least one) of program modules, may be stored in the storage device 54 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The node 112 may also communicate with one or more peripherals such as a keyboard, a pointing device, etc.; a display; one or more devices that enable a user to interact with the node 112; and/or any devices (e.g., network card, modem, etc.) that enable the node 112 to communicate with one or more other computing devices via the SAN fabric 102. Such communication may occur via Input/Output (I/O) interfaces 58. The node 112 may communicate with one or more networks such as a local area network (LAN) 104, a general wide area network (WAN), and/or a public network (e.g., the Internet) via the network adapter 56. As depicted, the network adapter 56 communicates with the other components of the node 112 via bus. It should be understood that although not shown in the figures, other hardware and/or software components could be used in conjunction with the node 112. Examples, include, but are not limited to: microcode, device drivers, redundant processing units, external disk drive arrays, RAID systems, tape drives, and data archival storage systems, etc. The node 112 may be interconnected with other node via a host channel adapter (HCA) such as InfiniBand™.

Hardware and/or software components of the tape library 130, the tape drives 132, the control terminal 140 may include, similar to the node 112 shown in FIG. 3, a processor, a memory, a read only memory, a network adopter, and a I/O interface (not shown).

Figure 4:
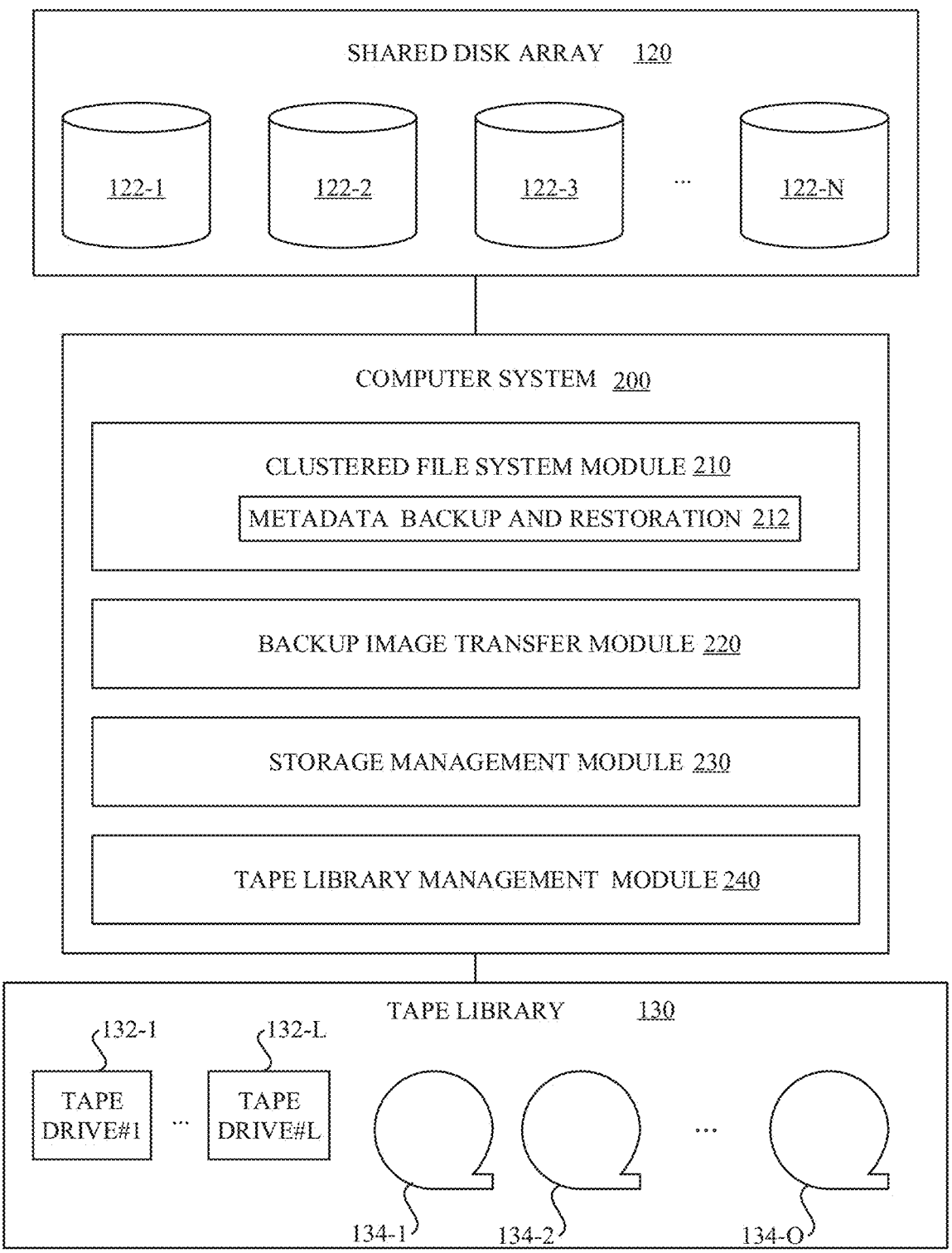
FIG. 4 illustrates a block diagram of the hierarchical storage system, according to the exemplary embodiment of the present invention.

Referring now to FIG. 4, a block diagram of the hierarchical storage system 100 is illustrated, according to an embodiment of the present disclosure. As illustrated in FIG. 4, the hierarchical storage system 100 may include a computer system 200 connected to the shared disk array 120 and the tape library 130. The computer system 200 may be composed of the nodes 112 in the cluster 110 shown in FIG. 2 and FIG. 3.

In such storage system having the tape tier (the tape library 130), the tape tier may be used for backing up the file system in order to protect data against potential data loss events such as disasters. To resume business as early as possible, it is important to reduce the time to complete the restoration of the file system using the sequential access media. It is also important to reduce the cost required for preparing a restore site.

Although the time required for restoration may depend on the number of files, total size of the files, etc., it may be roughly estimated that the reading of, for example, 1 billion files of 10 MB (totally 10 petabyte) with 400 MB/sec (the transfer speed assumes one tape drive), and using a plurality of tape drives in parallel, (the transfer speed may be improved) may take approximately 290 days or more.

Therefore, to improve the restoration speed, embodiments of the present disclosure may provide a backup and restoration functionality of a target file system to be incorporated into the hierarchical storage system 100. Let us focus on one of the file systems, e.g. the file system #1 shown in FIG. 1.

The proposed backup functionality, may focus on the operating site (e.g. the operating site #1) at which the target file system (e.g. the file system #1) natively operates. The backup functionality may be triggered by a schedule or an explicit request from the administrative user. During the backup process, the computer system 200 may acquire a backup image including metadata of target files from the target file system. Each target file may be migrated or pre-migrated to the tape tier in advance, thus the metadata of each target file may indicate a tape medium which contains the data of the target file. Then, the computer system 200 may transfer the backup image to a remote computer system in a relevant restore site (e.g. the operating site #2) via the network (e.g. the network 40).

The proposed restoration functionality may focus on the restore site (e.g. the operating site #2) in which the target file system (e.g. the file system #1) is restored. Note that the restore site may also be an operating site for another file system (e.g. the file system #2). The restoration functionality may be triggered by a schedule, an explicit request or the receiving of the backup image. During the restoration process, in the restore site, the computer system 200 may receive the backup image of the target file system, from the computer system 200 in the operating site (e.g. the operating site #1) for the target file system via the network 40. The metadata of the target file indicates a corresponding tape medium, which is used at the operating site and would be transported to the restore site. The computer system 200 restores the metadata of the target file system using the backup image. Since the restore site is also the operating site, the target file system (e.g. target file system #1), sharing the resources with other existing file system (e.g. file system #2), may be restored on the computer system 200 in the restore site. Such shared resources may include nodes, disk caches, tape drives, etc.

It should be noted that a time lag between occurrences of the receiving and the restoring may be allowed. The restoration may be performed, for example, during off-peak hours based on a schedule. Restoration may be completed by inserting the transported tape media 134 to the tape library in the restore site.

Figure 5:
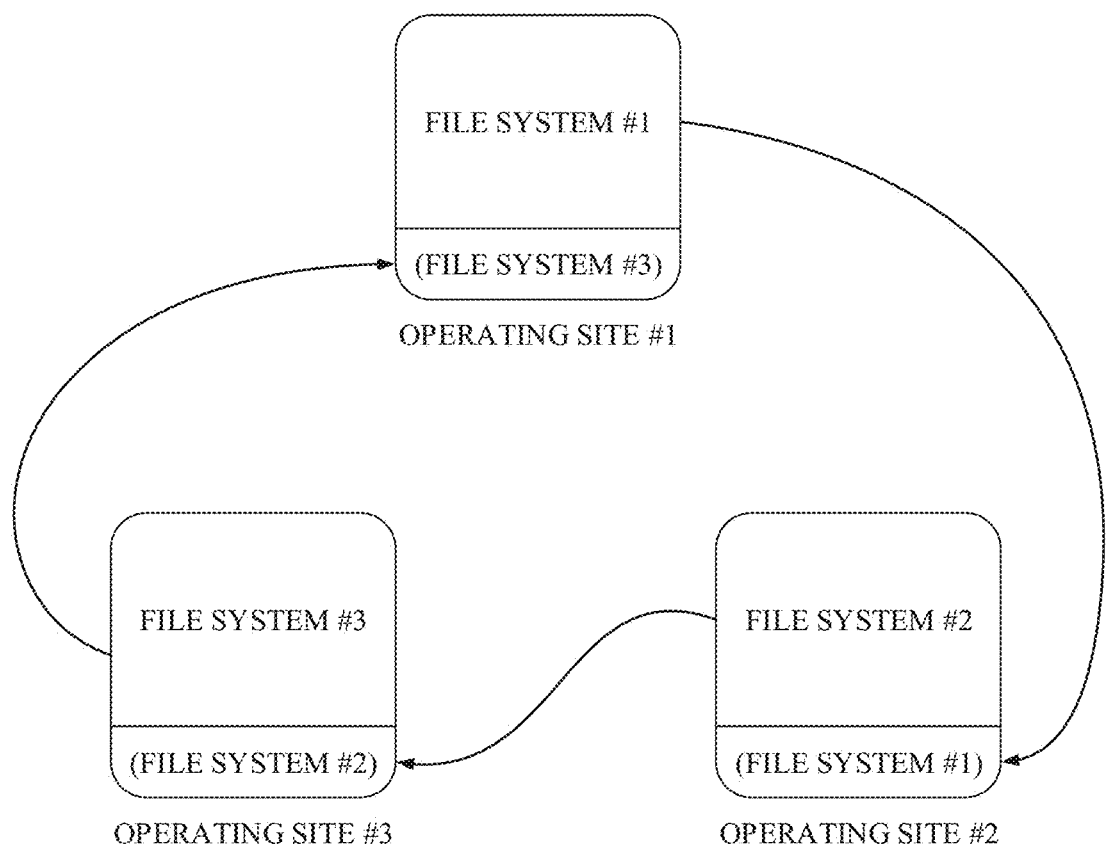
FIG. 5 depicts a way of backup and restoration of file systems in the environment by using backup and restoration functionalities provided in the hierarchical storage system, according to the exemplary embodiment of the present invention.

Referring now to FIG. 5, an exemplary method of backup and restoration is depicted, according to an embodiment of the present disclosure. As shown in FIG. 5, each operating site has its own native file system. The backup image of metadata may be acquired from the file system at one operating site and may be transferred to a remote site allocated as a relevant restore site for the file system from among the operating sites so as to restore the file system on the remote site.

In this example, the metadata of the file system #1 on the operating site #1 may be backed up and transferred to the operating site #2 to restore the file system #1, the metadata of the file system #2 on the operating site #2 may be backed up and transferred to the operating site #3 to restore the file system #2, and so on. Regarding to certain file systems, the allocation of an operating site and a relevant restore site may be predefined.

The target file system may be restored on free disk space of the restore site during an idle time. So, on each site (e.g. the operating site #1), the computer system may manage the restored file system originated form the remote site (e.g. the file system #3) in addition to the native file system (e.g. the file system #1). The computer system may be configured to manage a plurality of file systems by sharing resources such as nodes 112, disk caches 122, tape drives 132, SAN fabric 102, etc.

It should be noted that the file system natively operated on the computer system includes both metadata and body of the target files, however, the file system restored on the computer system includes merely metadata of the target files. Once the metadata of the file system has been restored at the restore site, the directory structure may be accessible. However, at this point, if a user tries to access one of the files on the restored file system, an error may occur since the body of the target files does not exist at the restore site. After the tape media that contain the body of the files are inserted to the tape library on the restore site, reading and writing of files at the remote site are accepted immediately.

Referring again to FIG. 4, the computer system 200 on each operating site may include a clustered file system module 210, a backup image transfer module 220, a storage management module 230 and a tape library management module 240.

The clustered file system module 210 may be a software component that manages the clustered file systems in the hierarchical storage system 100. In the describing embodiment, the clustered file system module 210 may provide a metadata backup and restoration functionality 212 that may be configured to acquire a backup image from the native file system and to restore metadata of a file system using a backup image obtained from a remote computer system in a remote site.

Hereinafter, with regarding to certain operating site, a file system that is natively operated at the operating site is referred to as "local site file system" and the backup image acquired from the local site file system is referred to as "local site backup image". A file system that is natively operated at a remote site for which the operating site is allocated as a restore site is referred to as "remote site file system" and the backup image acquired from the remote site file system is referred to as "remote site backup image".

The backup image transfer module 220 may be a software component that manages transfer of the backup images between the computer systems on each operating site through the network. The backup image transfer module 220 may be configured to receive the remote site backup image from the remote computer system in the remote site for which the operating site is allocated as the restore site. The backup image transfer module 220 is further configured to transfer the local site backup image to a remote computer system in a restore site for the local site file system. The remote computer system to which the local site backup image is transferred may be equal to or different from the remote computer system from which the remote site backup image may be received.

The storage management module 230 may be a software component that provides integration of the clustered file system managed by the clustered file system module 210 with the tape tier managed by the tape library management module 240. The storage management module 230 manages migration and recall activities in the hierarchical storage system 100. The storage management module 230 enables migration of file from the disk tier to the tape tier and recall of the migrated file when the migrated file is accessed.

The tape library management module 240 may be a software component that allows for performing file operations to the tape media 134 and providing interface to manipulate files on the tape media 134 in the tape library 130. The tape library management module 240 accesses space on the tape media 134 through their file system interface and handles data as file objects and associated metadata. The tape library 130 may be mounted entirely, and the tape media 134 in the tape library 130 may be accessed as subdirectories under a mount point of the file system.

Before describing the backup and restoration functionalities of the proposed system, normal functionalities including migration, pre-migration and recall in the hierarchical storage system will be described.

Migration is a process in which files are moved from the disk tier to the tape tier, which leaves a small stub file on the disk tier. Pre-migration is a process in which files are moved from the disk tier to the tape tier without replacing the file body with stub file on the disk tier. Identical copies of the files are on the disk tier and on the tape tier. Recall is a process in which the migrated files are moved from the tape media back to the originating disk tier.

The files newly added or the files overwritten to the hierarchical storage system 100 may initially be only on the disk tier, thus the state of the file is initially "resident". The file may be migrated to the tape tier by the migration process, after which the file is a stub on the disk and the IDs of the tapes storing the copies are written to metadata. The state of such file is referred as "migrated". The file may be recalled from the tape tier when an application attempts to read from the file. The state of the file that is stored on both the disk and the tape tiers is referred as "pre-migrated". Also the file may be pre-migrated to the tape tier by running the pre-migration process.

Figure 6:
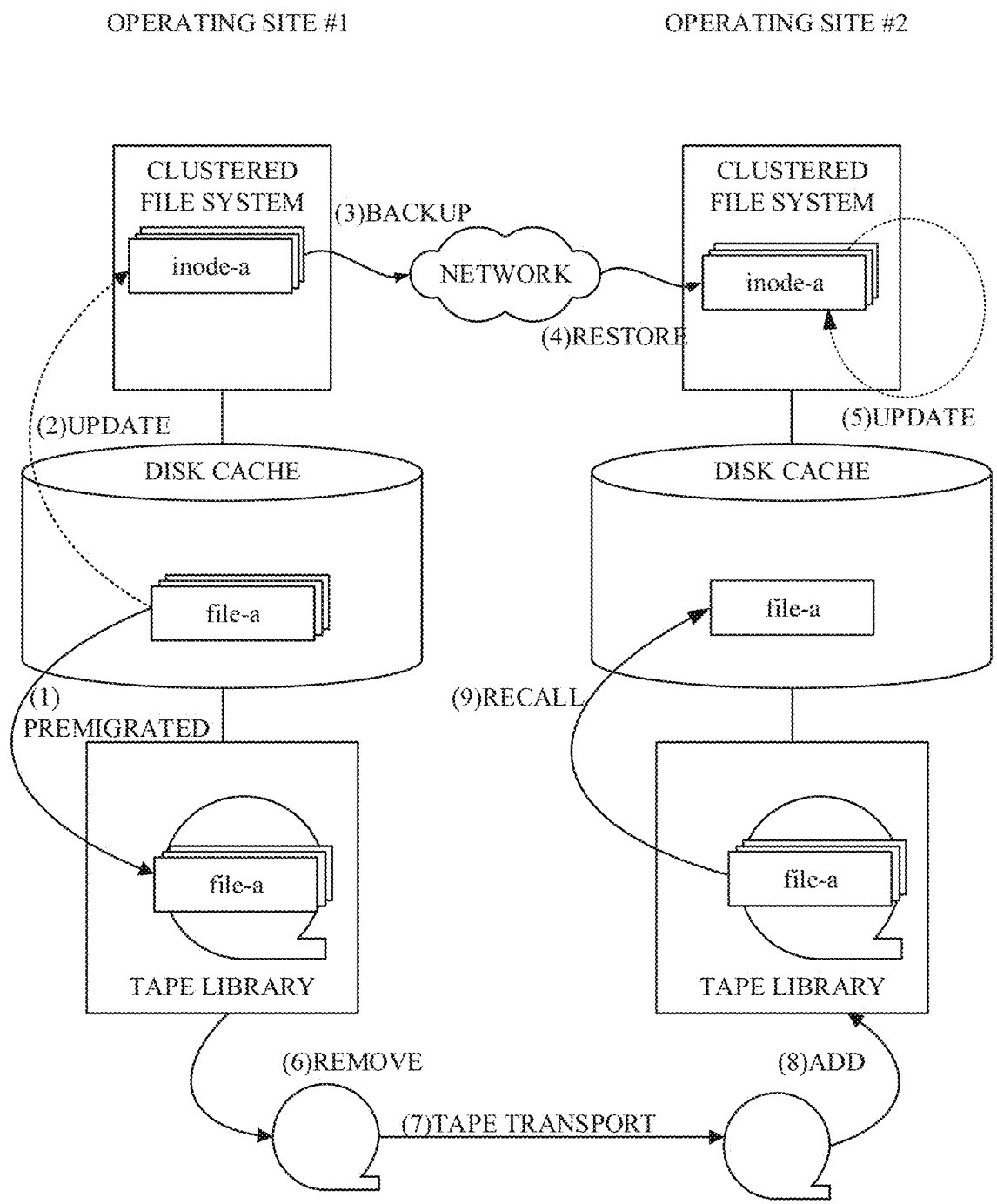
FIG. 6 depicts an overview of backup and restoration flow of a target file system between the operating sites by using the backup and restoration functionalities provided in the hierarchical storage systems, according to the exemplary embodiment of the present invention.

Referring now to FIG. 6, an overview of a backup and restoration flow of the target file system between the operating sites is depicted, according to an embodiment of the present disclosure. In this embodiment, it's assumed that the backup and restoration flow is initiated at the operating site #1 (left hand side in FIG. 6), and that the operating site #2 (right hand side in FIG. 6) is defined as a relevant restore site for the operating site #1. In the present embodiment, the target files may be required to be pre-migrated or migrated to the tape tier in advance. A specific tape pool may be prepared for backup.

Regarding the operating site #1, before the backup process is initiated (1) the storage management module 230 may migrate or pre-migrate (both includes copy operation) the target files to the tape media in the tape pool. Then, (2) the file status in the metadata (e.g. inode) may be updated to "pre-migrated" or "migrated" status, either of which indicates the target file may be stored in the tape tier.

After all target files are pre-migrated or migrated to the tape tier, (3) the novel backup process may be initiated. During the backup process, the clustered file system module 210 acquires the backup image including the metadata from the target file system and the backup image transfer module 220 transfers the acquired backup image to the computer system in the operating site #2 via the network.

Regarding the operating site #2, (4) the novel restoration process may be initiated. During the restoration process, the backup image transfer module 220 receives the backup image and the clustered file system module 210 restores the metadata of the target file system using the backup image. Simultaneously, (5) the file status of the target file in the metadata may be updated to "migrated" status, which indicates that the target file is stored in the taper tier and is not stored in the disk tier.

Note that a time lag between occurrences of the receiving and the restoring may be allowed. In a particular embodiment, the restoration of the target file system may be performed by using available resources immediately after the backup image is transferred on a daily basis for example. In another particular embodiment, the restoration may be performed after arrival of the tape media that are transported separately. The restoration may be performed in any time. Also the restoration may be performed at each time or in batch according to occurrences of the backup image transfer.

At appropriate timing, (6) the tape library management module 240 removes the tape medium from the tape pool at the operating site #1 and (7) the removed tape medium may be transported from the operating site #1 to the operating site #2. For example, the backup process may be performed every day and the tape medium may be transported every week by means of air transportation, marine transportation, land transportation, etc. The transported tape media may be stocked on a shelf at the operating site #2 for example.

If necessary, the number of stocked tape media may be reduced by consolidating active files that are spread over multiple tape media. In this case, the metadata in the restored target file system may be modified to identify the tape medium that stores the body of the consolidated file.

In time of disaster, operators may just insert the stocked tape media to the tape library to resume the business operations, since the metadata of the target file system has already been restored. In response to inserting, (8) the tape library management module 240 adds the inserted tape media to the tape pool of the restored target file system in the operating site #2. After the operating site #2 resumes, in response to access request to the target file, corresponding tape medium where the data of the file is stored may be identified based on the tape ID in the metadata, and (9) the storage management module 230 may recall the target file from the corresponding tape medium.

Figure 7:
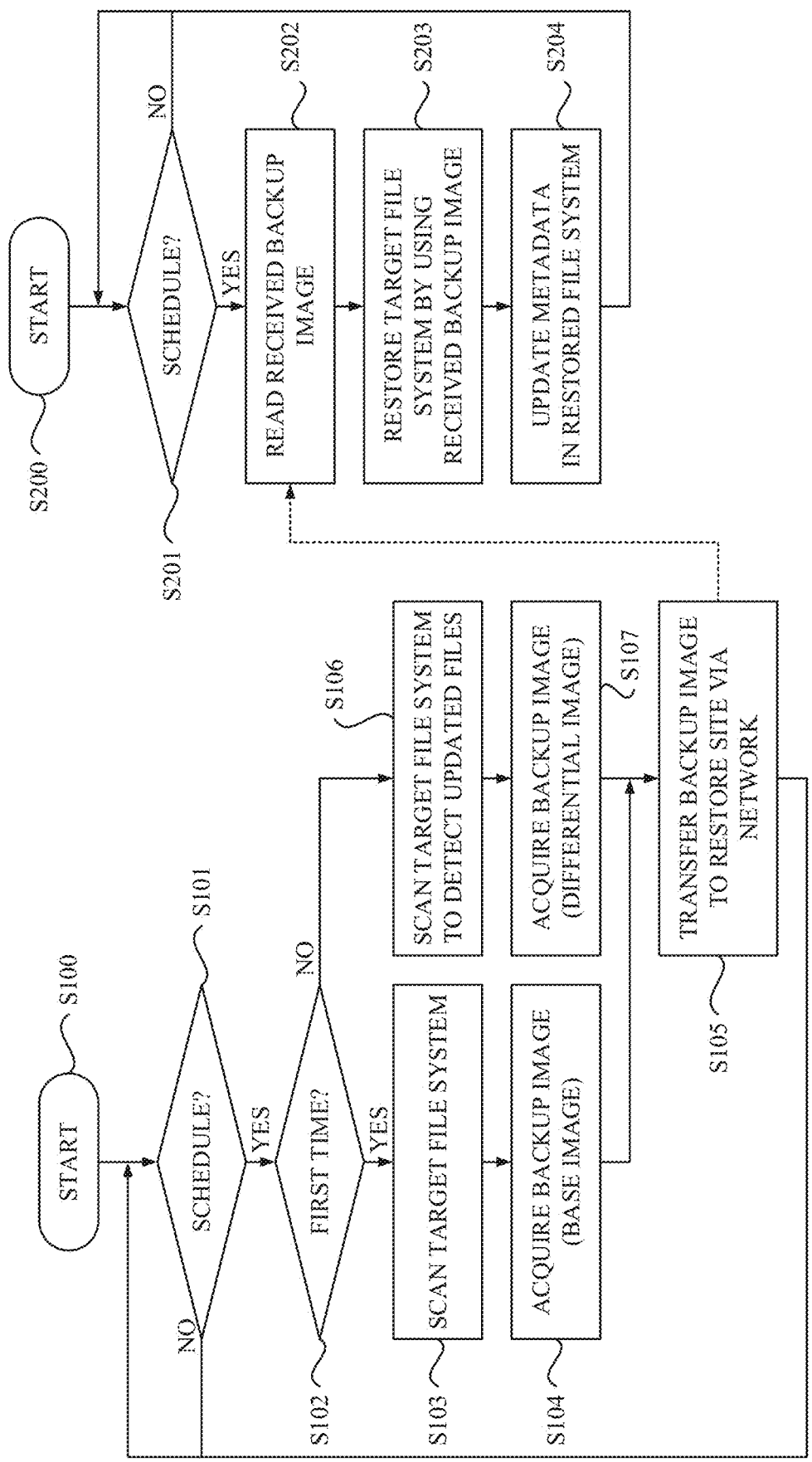
FIG. 7 shows flowcharts depicting novel backup (left hand side) and restoration (right hand side) processes, according to the exemplary embodiment of the present invention.

Referring to FIG. 7, flowcharts depicting the novel backup and restoration processes are shown, according to an embodiment of the present disclosure. As shown in FIG. 7, the backup process begins at step S100. Note that the process shown in the left hand side of FIG. 7 may be performed by the node 112 allocated to handle the backup process in response to starting the system.

At Step S101, the node 112 waits for a scheduled time. If the node 112 determines that the scheduled time has come in step S101, the process branches to step S102. At Step S102, the node 112 determines whether the backup process is first time or not.

If the node 112 determines that the backup process is the first time in step S102 (YES), the process branches to step S103. At Step S103, the node 112 scans the target file system to list up all target files. Files that have already been pre-migrated or migrated to the tape pool may be detected as targets for backup. At Step S104, the node 112 acquires the backup image from the target file system by the metadata backup and restoration functionality 212 provided by the clustered file system module 210. The backup image may be a base image of the target file system for the first time.

At step S105, the node 112 transfers the backup image to the relevant restore site via the network by the backup image transfer module 220 and the process loops to step S101 for next scheduled time. The backup image may be transferred to the relevant restore site and accumulated on the storage device.

If the node 112 determines that the backup process is second time or later in step S102 (NO), the process branches to step S106. At Step S106, the node 112 scans the target file system to list up all target files updated after the previous backup process. At Step S107, the node 112 acquires the backup image including the metadata of updated target files from the target file system by the metadata backup and restoration functionality 212. The backup image may be an incremental or differential image of the target file system from previously acquired images, for second time or later. At step S105, the node 112 transfer the backup image to the restore site via the network by the backup image transfer module 220.

It should be noted that the metadata may occupy a substantially small space (e.g. 512 bytes per file for inode) on the disk. Acquiring the metadata by using the metadata backup and restoration functionality 212, the size of the acquired metadata may be reduced (e.g. approximately 300 bytes per file for inode) since redundant portions of the metadata may be excluded. In this embodiment, it's assumed that one hundred thousand files are newly created each day and a differential backup is taken every day. In this case the size of the backup image including inodes is estimated to be 30 MB. Network traffics, computation resource and disk accesses for such small backup images are expected to be negligible. Thus, there is no impact on business operations using the native file system at the operating site.

As shown in FIG. 7, the restoration process begins at step S200. Note that the process shown in the right hand side of FIG. 7 may be performed by the node 112 allocated to handle the restoration process in response to starting the system.

At Step S201, the node 112 waits for a scheduled time. If the node 112 determines that the scheduled time has come in step S201 (YES), the process branches to step S202. At step S202, the node 112 reads the received backup image that is transferred at step S105 in the backup process. At step S203, the node 112 restores the target file system using the received backup image by the metadata backup and restoration functionality 212. The received backup image may be the base image of the target file system for first time or the incremental or differential image of the target file system for second time or later. At S204, the node 112 updates the status of the target files in the metadata of the restored target file system so as to indicate that each target file is stored in the tape tier and is not stored in the disk tier. Then, the process loops to step S201 for next scheduled timing.

Network traffics, computation resources and disk accesses for restoration are expected to be negligible. Thus, there is no impact on business operations using the native file system that shares the resource with the restored file system at the restore site.

The proposed backup and restoration function according to one or more embodiments of the present invention, may have superiority over any other solutions including a mirroring backup functionality and SOBAR (scale out backup and restore) functionality of GPFS™ in terms of impacts on business operation, resource costs and restoration times. Note that some embodiments may not have such potential advantages and these potential advantages are not necessarily required of all embodiments.

The mirroring backup is a mechanism in which any write operations to a target file system at an operating site transmit to a restore site so as to synchronize between a restored file system on the restore site and the target file system on the operating site. For this mechanism, backup storage servers with a hardware configuration almost identical to target storage servers are required in advance. Consequently a double cost is required for initial investment. Also, heavy network traffic for synchronization may occur during operation, resulting in network congestion, increasing of usage charge as well as performance impact on business operation at the operating site. Taking such performance degradation into account, further initial cost may be required to construct the operation site using higher performance servers.

The SOBAR is a mechanism which takes a snapshot of structural metadata of a file system as a backup image. The backup image of the file system structure may be used to restore the file system in the event of a disaster. Although the mechanism does not store the body of backup files, however, it takes long time to restore the file system from the backup image. Based on the condition used in above mentioned estimation, restoring of 1 billion files with may take 12 days or more, for example. Also, resource cost is still required to prepare a restore site that is almost identical to a target operating site.

According to one or more embodiments of the present invention, the proposed backup and restoration functionality is provided, in which the backup image including metadata of target files from the target file system may be acquired and transferred to a remote computer system where the file systems are operated. The target file system may be restored on the remote computer system by using the transferred backup image. Accordingly, the novel backup and restoration functionality may have superiorities in the following respects:

(1) Impact on business operations may be negligible: Since only minimum amount of backup data including merely metadata may be restored using available computational resources that are not being used at the restore site, there may be merely negligible impact on business operations.

(2) Cost dedicated for restoration may be small: The minimum amount (an amount that corresponds to the metadata) of additional space on a disk is required for the restore site. Unlike the mirroring backup mechanism, space required for the restored target file system may be shared with the local site file system of the restore site.

The capacity required to restore inodes of target file system is merely 512 bytes per file. It may be assumed that averagely one million files may be stored on a tape medium having a capacity of 10 TB. In this condition, the metadata of these files occupies only 512 MB of the disk space. Accordingly, an extra capacity of 0.005% for metadata restoration may be sufficient. In addition, additional capacity may be necessary for reading files that are required for resuming business operations. The required extra capacity may depend on the type of the business operations.

Figure 8:
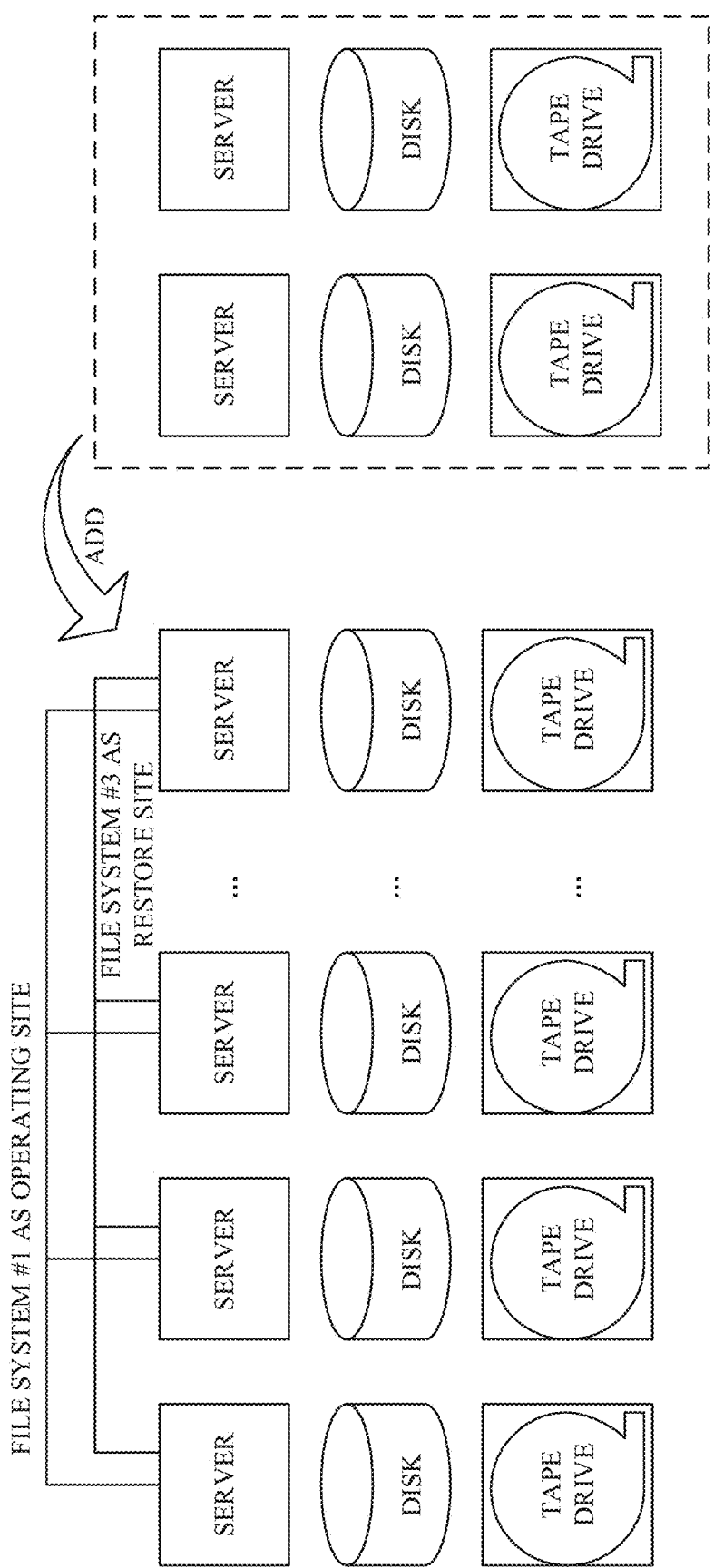
FIG. 8 depicts resources shared between a local site file system and a remote site file system at an operating site, according to the exemplary embodiment of the present invention.

Referring to FIG. 8, resources shared between a local site file system (natively operated on the site) and a remote site file system (additionally operated on the site as backup) on the same computer system at the operating site is depicted, according to an embodiment of the present disclosure. As shown in FIG. 8, nodes, disks, and tape drives may already exist at the operating site for the local site file system and may be diverted for the restored remote site file system. Thus, a dedicated recovery site may not be required at least before data loss events. In other words, necessity of substantial resource cost may be delayed to after a time of disaster. After business operations have been resumed, resources may be added to the system as necessary at appropriate timing as depicted in FIG. 8.

The additional resources are only required in the event of a disaster. Since the frequency of such data loss event is very low, an average interval from the beginning of the business operations to the occurrence of such data loss event may range from several tens of years to several hundred years. Thus, the resource cost that should be procured after data loss event is expected to be low since such unit cost may declines year by year.

(3) Restoration time may be reduced: The metadata of the target file system may be restored in at least one remote site. The restoration may be performed at the remote site during an idle time with respect to normal business operations using available resources. Consequently, at the time of a disaster, business operations may be immediately resumed by merely inserting the tape media storing the body of the target files into the tape library. The restoration time may be expected to be reduced to substantially zero.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for backing up and restoring a target file system in a remote storage system by a computer system, the computer system being connected to a network, the remote storage system including a tier of sequential access media, the method comprising:

in response to a scheduled time being reached, scanning, by the computer system, the target file system to list target files in the target file system;

based on a predetermined migration policy, migrating the target files to a sequential access medium comprising a tape medium;

updating, in a metadata of the target files, a status of the target files, the metadata indicating the sequential access medium containing data associated with the target files;

in response to migrating the target files to the sequential access medium, acquiring a backup image from the target file system, the backup image including only the metadata corresponding to the target files in the target file system and excluding redundant portions of the metadata, wherein excluding redundant portions of the metadata reduces a size of the backup image, including inodes, in a way such that network traffic, computation resources and disk access are negligible, wherein the backup image comprises a base image of the target file system during a first backup process or a differential image of the target file system from previously acquired backup images during subsequent backup processes;

transferring the backup image via the network to the remote storage system, the backup image is used to restore the metadata of the target file system by sharing a resource with a remote site file system operating in the remote storage system, wherein a location of the computer system is different than a location of the remote site file system;

restoring, from the remote storage system, the target file system using the transferred backup image, wherein the restoring is performed repeatedly during an idle time of the computer system based on a predetermined schedule, the computer system manages the restored target file system, the restored target file system comprising only metadata associated with the target files to substantially reduce a capacity required to restore the target file system and data transfer times; removing, by a tape library management module, the tape medium from a tape pool of the computer system;

adding, by the tape library management module, the tape medium to a tape pool of the restored target file system; and updating the status of the target files in the metadata of the restored target file system to indicate that each target file is stored in the tier of sequential access media and not in an upper tier above the tier of sequential access media.

2. The method of claim 1, further comprising:
scanning the target file system to detect updated files;
acquiring a backup image, wherein the backup image comprises a differential image; and
transferring the backup image to the remote computer system.

3. The method of claim 1, further comprising:
adding the sequential access medium storing the target file to the storage system; and
recalling the target file from the sequential access medium in response to an access request to the target file.

4. The method of claim 1, wherein the target file system is a clustered file system integrated with the tape medium.

5. The method of claim 1, wherein the acquiring and the transferring are performed repeatedly based on a predetermined schedule.

6. The method of claim 1, further comprising:
copying the target file to the sequential access medium and updating the metadata of the target file to indicate that the target file is stored in the tier of sequential access media.

7. The method of claim 1, further comprising:
based on a pre-migration policy, pre-migrating the target files to the tape medium; and
updating the status of the target file to indicate that the target file has been stored in the tier of sequential access media.

8. A computer system for backing up and restoring a target file system in a remote storage system, the computer system being connected to a network, the remote storage system including a tier of sequential access media, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

in response to a scheduled time being reached, scanning, by the computer system, the target file system to list target files in the target file system;

based on a predetermined migration policy, migrating the target files to a sequential access medium comprising a tape medium;

updating, in a metadata of the target files, a status of the target files, the metadata indicating the sequential access medium containing data associated with the target files;
    in response to migrating the target files to the sequential access medium, acquiring a backup image from the target file system, the backup image including only the metadata corresponding to the target files in the target file system and excluding redundant portions of the metadata, wherein excluding redundant portions of the metadata reduces a size of the backup image, including inodes, in a way such that network traffic, computation resources and disk access are negligible, wherein the backup image comprises a base image of the target file system during a first backup process or a differential image of the target file system from previously acquired backup images during subsequent backup processes;
    transferring the backup image via the network to the remote storage system, the backup image is used to restore the metadata of the target file system by sharing a resource with a remote site file system operating in the remote storage system, wherein a location of the computer system is different than a location of the remote site file system;
    restoring, from the remote storage system, the target file system using the transferred backup image, wherein the restoring is performed repeatedly during an idle time of the computer system based on a predetermined schedule, the computer system manages the restored target file system, the restored target file system comprising only metadata associated with the target files to substantially reduce a capacity required to restore the target file system and data transfer times;
    removing, by a tape library management module, the tape medium from a tape pool of the computer system;
    adding, by the tape library management module, the tape medium to a tape pool of the restored target file system; and
    updating the status of the target files in the metadata of the restored target file system to indicate that each target file is stored in the tier of sequential access media and not in an upper tier above the tier of sequential access media.

9. The computer system of claim 8, further comprising:
scanning the target file system to detect updated files;
    acquiring a backup image, wherein the backup image comprises a differential image; and
    transferring the backup image to the remote computer system.

10. The computer system of claim 8, further comprising:
    adding the sequential access medium storing the target file to the storage system; and
    recalling the target file from the sequential access medium in response to an access request to the target file.

11. The computer system of claim 8, wherein the target file system is a clustered file system integrated with the tape medium.

12. The computer system of claim 8, further comprising:
    based on a pre-migration policy, pre-migrating the target files to the tape medium; and
    updating the status of the target file to indicate that the target file has been stored in the tier of sequential access media.

* * * * *